United States Patent
Aoike (10) Patent No.: US 7,417,461 B2
(45) Date of Patent: Aug. 26, 2008

(54) SIGNAL OUTPUT CIRCUIT (75) Inventor: Masahiro Aoike, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 11/664,097

(22) PCT Filed: Jun. 3, 2005

(86) PCT No.: PCT/JP2005/010238

§ 371 (c)(1),
(2), (4) Date: Mar. 29, 2007

(87) PCT Pub. No.: WO2006/038346

PCT Pub. Date: Apr. 13, 2006

(65) Prior Publication Data

US 2007/0279121 A1 Dec. 6, 2007

(30) Foreign Application Priority Data

Oct. 1, 2004 (JP) ............................. 2004-290670

(51) Int. Cl.
H03K 19/0175 (2006.01)
(52) U.S. Cl. ........................ 326/82; 327/108
(58) Field of Classification Search ........... 326/82, 326/83, 86; 327/108, 423, 424; 330/146
See application file for complete search history.

(56) References Cited

U.S. PATENT DOCUMENTS 5,939,931 A 8/1999 Noro
6,281,715 B1 8/2001 DeClue et al.
6,316,964 B1 11/2001 Watarai
7,236,018 B1 * 6/2007 Wang et al. ................. 327/108

FOREIGN PATENT DOCUMENTS

| JP | 10-163846 | 6/1998 |
|---|---|---|
| JP | 11-345054 | 12/1999 |
| JP | 2000-174605 | 6/2000 |
| JP | 2001-85977 | 3/2001 |
| JP | 2002-368600 | 12/2002 |
| JP | 2003-101595 | 4/2003 |

* cited by examiner

Primary Examiner—Daniel D Chang
(74) Attorney, Agent, or Firm—McDermott Will & Emery LLP (57) ABSTRACT An LVDS output circuit steadily supplying an output current of magnitude I includes a current source 101 outputting a current of 2I, current sources 102, 103, 106, 107 allowing a current of ΔI to flow therethrough, and current sources 104, 105 allowing a current of I–ΔI to flow therethrough. Switches 117, 118 switch the polarity of the output depending on an input signal 116. At the time of polarity transition, switches 108, 109 are OFF while switches 110, 111 are ON. The output amplitude is thus (I+ΔI). Alternatively, the switches 108, 109 are ON while the switches 110, 111 are OFF. The output amplitude is thus (–I–ΔI). That is, although the balance of currents flowing through the current sources 102 to 107 changes permitting preemphasis, the total of the currents flowing through the current sources 102 to 107, i.e., power consumption is kept constant. This speeds up signal transmission and minimizes power supply noise.

11 Claims, 8 Drawing Sheets

Time period (a)

Time period (b)

Time period (c)

Time period (d)

SIGNAL OUTPUT CIRCUIT

RELATED APPLICATIONS

This application is the U.S. National Phase under 35 U.S.C. § 371 of International Application No. PCT/JP2005/010238, filed on Jun. 3, 2005, which in turn claims the benefit of Japanese Application No. 2004-290670, filed on Oct. 1, 2004, the disclosures of which Applications are incorporated by reference herein.

TECHNICAL FIELD

The present invention relates to a signal output circuit used for an interface between semiconductor devices and the like.

BACKGROUND ART

In recent years, low voltage differential signaling (LVDS) technology has been employed for speedup of signal transmission and reduction in power consumption. In a conventional LVDS interface employing this technology, signal transmission is made using differential amplitude obtained with constant current sources.

An LVDS interface as described above is applied to an interface between a controller LSI and a laser diode driver IC for a recordable DVD (digital versatile disc), for example. Specifically, the controller LSI generates a write waveform for the DVD, and the laser diode driver IC drives a semiconductor laser with a signal corresponding to the write waveform. The LVDS technology described above is used for this interface because the write waveform requires strict timing.

However, as the transmission rate becomes higher, for example, high-frequency loss increases on the transmission line, resulting in reduction in voltage amplitude at the receiver end. Therefore, in the cases of transmitting a random signal and the like, the amplitude may change depending on the pulse width, the eye opening may be narrowed, and pattern-dependent jitter tends to occur. In the application of the technology to DVDs as described above, a recording waveform can be transmitted without trouble as long as the recording speed is low. If high-speed recording is attempted, however, high-frequency loss on the transmission line will become too large to be negligible, and thus transmission of a correct write waveform will no more be possible.

To prevent the reduction in voltage amplitude at the receiver end as described above, a technology using a preemphasis circuit has been proposed, in which the amplitude of the output signal is increased at the time of state transition of an LVDS output circuit, to thereby suppress dulling of edge portions and thus reduce the amplitude change depending on the pulse width (See Patent Literature 1, for example).

Patent Literature 1: Japanese Laid-Open Patent Publication No. 2002-368600

DISCLOSURE OF THE INVENTION

Problem to be Solved by the Invention

However, using a preemphasis circuit as described above, the current consumption varies with preemphasis operation, and as a result, power supply noise will easily occur. Accordingly, measures against power supply noise will be necessary for analog function blocks in a digital-analog mixed LSI such as the controller LSI for DVDs described above and the like.

In view of the above, an object of the present invention is permitting preemphasis operation to be performed without causing a variation in current consumption, to thereby speed up signal transmission and minimize power supply noise.

Means for Solving the Problem

To solve the above problem, the first signal output circuit of an embodiment of the present invention is a signal output circuit having a pair of output terminals and outputting an output current of a predetermined magnitude and a polarity corresponding to the level of an input signal during a steady state, the signal output circuit including:

an output current path permitting a current to flow via a passage between the output terminals; and a bypass path permitting a current to flow bypassing the passage between the output terminals, wherein during preemphasis, the current flowing via the output current path is increased while the current flowing via the bypass path is decreased, to keep current consumption equal to that during the steady state.

The second signal output circuit of an embodiment of the present invention is the first signal output circuit further including a high-potential side current source and a low-potential side current source both allowing a current greater than the output current to flow therethrough, wherein during the preemphasis, the current flowing through the high-potential side current source and the low-potential side current source flows via the output current path, and during the steady state, part of the current flowing through the high-potential side current source and the low-potential side current source flows via the bypass path.

The third signal output circuit of an embodiment of the present invention is the second signal output circuit, wherein during the steady state, the bypass path allows a current flowing through the high-potential side current source to flow to the low-potential side current source by a predetermined amount.

The fourth signal output circuit of an embodiment of the present invention is the second signal output circuit, wherein the bypass path includes:

a low-potential side bypass circuit permitting bypassing of a current flowing from the high-potential side current source to the passage between the output terminals by a predetermined amount; and a high-potential side bypass circuit permitting bypassing of a current flowing from the passage between the output terminals to the low-potential side current source by a predetermined amount, wherein the high-potential side bypass circuit and the low-potential side bypass circuit are switched between a state of permitting bypassing of a current flowing between the output terminals and a state of being disconnected from the output terminals and connected in series to each other.

The fifth signal output circuit of an embodiment of the present invention is a signal output circuit having a pair of output terminals and outputting an output signal of a predetermined magnitude and a polarity corresponding to the level of an input signal during a steady state, the signal output circuit including:

a first current source for allowing a current twice as large as the output current to flow therethrough;

a switching element for selectively connecting the first current source to either one of the pair of output terminals; and second and third current sources each connected to one or the other of the output terminals for allowing a current twice as large as the output current in total to flow therethrough, wherein during preemphasis when the first current source is connected to one of the output terminals in response to a level change of the input signal, a current flowing through the second current source connected to the one of the output terminals is reduced by a predetermined amount, and a current flowing through the third current source connected to the other of the output terminals is increased by the predetermined amount.

With the above configuration, the current consumption during the steady state is kept equal to that during the preemphasis, or the current consumption is kept constant by means of the high-potential side or low-potential side current source or the first current source. Therefore, the current consumption is prevented from varying with whether or not the preemphasis operation is involved, and thus no power supply noise occurs.

The sixth signal output circuit of an embodiment of the present invention is the fifth signal output circuit, wherein the second and third current sources respectively have a plurality of constant current circuits, and the magnitudes of the currents flowing through the second and third current sources are controlled by selectively connecting the constant current circuits to the output terminals.

With the above configuration, the preemphasis can be controlled using the switching element. Therefore, speedup and size reduction can be attained easily compared with the case of analog current control.

The seventh signal output circuit of an embodiment of the present invention is the fifth signal output circuit, wherein the second and third current sources respectively have a current mirror circuit, and the magnitudes of the currents flowing through the second and third current sources are controlled by controlling the magnitude of a current of a current source serving as a mirror source.

With the above configuration, the increase amount of the amplitude obtained by the preemphasis can be easily adjusted to an optimum amount for each system.

The eighth signal output circuit of an embodiment of the present invention is any one of the first to fifth signal output circuits, further including:

a first flipflop circuit for outputting the input signal in synchronization with a predetermined clock signal; and a second flipflop circuit for outputting a signal based on a difference in level between an input signal and output signal of the first flipflop circuit in synchronization with the clock signal to control the timing of the preemphasis.

With the above configuration, in the case that the input signal makes transition in synchronization with the clock signal, the control signal for the preemphasis can be generated with a simple gate circuit, and thus the device size can be reduced.

The ninth signal output circuit of an embodiment of the present invention is any one of the first to fifth signal output circuits, further including a delay circuit for delaying the input signal, wherein the timing of the preemphasis is controlled based on a difference in level between the input signal and a delayed signal.

With the above configuration, even in the case that the input signal makes transition without synchronizing with the clock signal, the control signal for the preemphasis can be generated with a simple gate circuit, and thus the device size can be reduced.

The tenth signal output circuit of an embodiment of the present invention is any one of the first to fifth signal output circuits, wherein the timing of the preemphasis is controlled based on the level of the input signal and the polarity of an output signal.

With the above configuration, the control signal for the preemphasis is generated by comparing the output signal with the input signal. Thus, even in the event of change of the floating capacitance to ground at the output terminals and the like, optimum preemphasis control can be attained.

The eleventh signal output circuit of an embodiment of the present invention is any one of the first to fifth signal output circuits, wherein the increase amount of a current flowing via the output current path or the increase/decrease amount of a current flowing through the second and third current sources is controlled depending on the frequency of the input signal.

With the above configuration, for the high-frequency loss that increases as the frequency becomes higher, the increase amount of the amplitude obtained by the preemphasis can be adjusted to correspond to the frequency.

EFFECT OF THE INVENTION

According to the present invention, the signal transmission can be sped up, and also the power supply noise can be minimized.

| DESCRIPTION OF REFERENCE NUMERALS | |
|---|---|
| 101-107 | Current sources |
| 108-111 | Switches |
| 112-115 | Control signals |
| 116 | Input signal |
| 117, 118 | Switches |
| 119, 120 | Output terminals |
| 401 | Data signal |
| 402, 403 | Gate circuits |
| 404 | Clock signal |

-continued

DESCRIPTION OF REFERENCE NUMERALS

| | |
|---|---|
| 405-407 | Flipflops |
| 501 | Delay circuit |
| 502, 503 | Gate circuits |
| 504, 505 | NOT circuits |
| 601 | Voltage comparator |
| 602, 603 | Gate circuits |
| 604, 605 | NOT circuits |
| 701 | Frequency-voltage converter |
| 1101, 1102, 1131 | Current sources |
| 1102 | Current source |
| 1111 to 1114, 1132 | Switches |
| 1121, 1122 | Output terminals |
| 1131 | Current source |
| 1132 | Switch |
| 1141, 1143 | Current sources |
| 1142, 1144 | Switches |
| 1145 | Switch |
| 1146 | switch |
| 1201 to 1203 | P-channel transistors |
| 1204, 1205 | N-channel transistors |
| 1301, 1302 | Current sources |

BEST MODE FOR CARRYING OUT THE INVENTION

Hereinafter, embodiments of the present invention will be described in detail with reference to the drawings.

Embodiment 1

Figure 1:
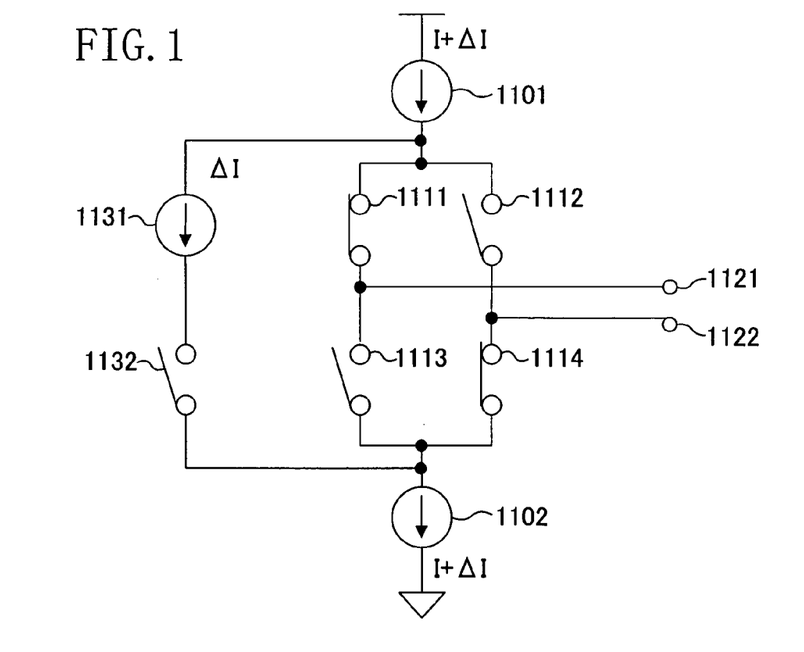
FIG. 1 is a circuit diagram of an LVDS output circuit of Embodiment 1.

FIG. 1 is a circuit diagram of an LVDS output circuit as Embodiment 1 of the present invention. Note that in the following description it is assumed that the steady-state output current of the output circuit is ±I and the preemphasis output current at the time of polarity reversal is ±(I+ΔI).

As shown in FIG. 1, the output circuit includes current sources 1101, 1102 and 1131 and switches 1111 to 1114 and 1132.

The current sources 1101 and 1102 are current sources having an output of (ejecting or sucking) a current of magnitude (I+ΔI), and the current source 1131 is a current source allowing a current of magnitude (ΔI) to flow therethrough.

The switches 1111 to 1114 are switches for switching the polarity of the output depending on an input signal not shown. For example, control is made so that, if the input signal is in a high (H) level, the switches 1111 and 1114 are ON while the switches 1112 and 1113 are OFF, and if the input signal is in a low (L) level, the switches 1111 and 1114 are OFF while the switches 1112 and 1113 are ON.

The switch 1132 is a switch connected with the current source 1131 in series and controlled to be OFF during preemphasis, that is, for a predetermined duration at the time of level transition of the input signal, and ON during the remaining steady-state time period.

An external terminating resistance not shown is connected to output terminals 1121 and 1122, to allow a current to flow from the output terminal 1121 to the output terminal 1122 if the input signal is in H level, while allowing a current to flow in the opposite direction if the input signal is in L level.

In the output circuit configured as described above, when the input signal makes transition from L level to H level (during the preemphasis), the switches 1111 and 1114 are turned ON, the switches 1112 and 1113 are turned OFF, and the switch 1131 is turned OFF. In this state, all the current flowing through the current sources 1101 and 1102 flows between the output terminals 1121 and 1122. The output amplitude is therefore (I+ΔI). Thereafter, when the switch 1132 is turned ON (during the steady state), a current (ΔI) among the current flowing through the current sources 1101 and 1102 flows through the current source 1131, and thus the output amplitude is (I).

When the input signal makes transition from H level to L level, the switches 1111 and 1114 are turned OFF, the switches 1112 and 1113 are turned ON, and the switch 1132 is first turned OFF and then ON. Likewise, therefore, the output amplitude first becomes (−I−ΔI), and then (−I).

As described above, by performing preemphasis at the timing of transition of the input/output signal, steep edges are obtained. Moreover, the current supplied from the current source 1101 and the current drawn to the ground by the current source 1102 are both (I+ΔI) irrespective of whether during the preemphasis or during the steady state. In this way, since the current consumption is kept constant at any time, occurrence of power supply noise due to a variation in current consumption is prevented. Thus, the output circuit of this embodiment can be easily applied to high-speed interfaces between a plurality of LSIs and between devices. In particular, by using the inventive output circuit for a digital-analog mixed LSI, it is easily possible to configure a high-speed interface while minimizing power supply noise.

Embodiment 2

An output circuit of Embodiment 2 will be described. Note that in the embodiments to follow, components having similar functions to those in Embodiment 1 and the like are denoted by the same reference numerals, and the description thereof is omitted.

Figure 2:
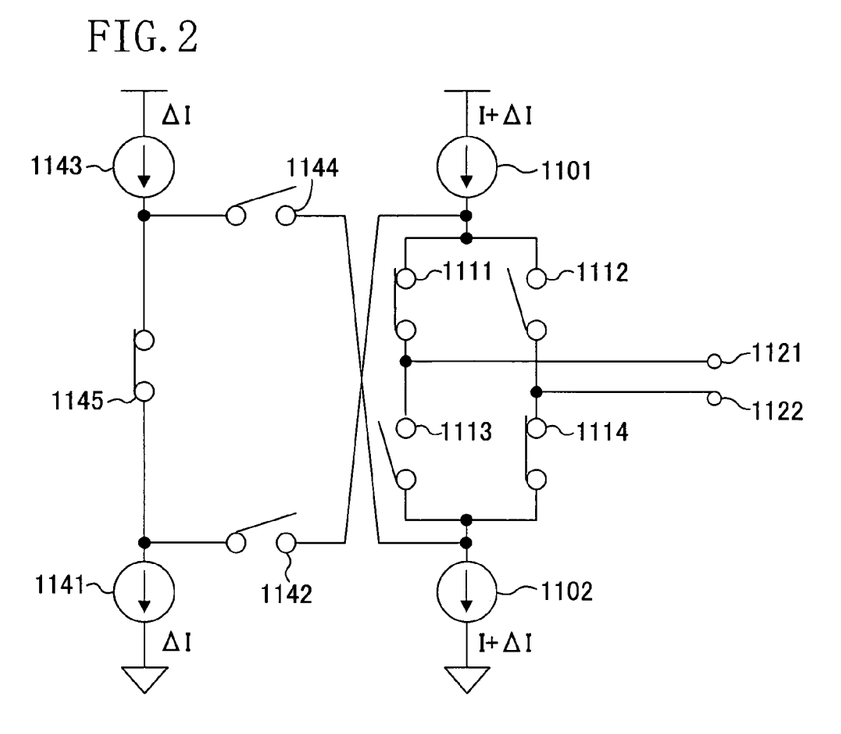
FIG. 2 is a circuit diagram of an LVDS output circuit of Embodiment 2.

As shown in FIG. 2, the output circuit of Embodiment 2 includes a current source 1141 and a switch 1142, a current source 1143 and a switch 1144, and a switch 1145, in place of the current source 1131 and the switch 1132.

The current sources 1141 and 1143 respectively allow a current of magnitude (ΔI) to flow therethrough. The switches 1142 and 1144 are ON during the steady state, while the switch 1145 is ON during preemphasis.

Figure 3:
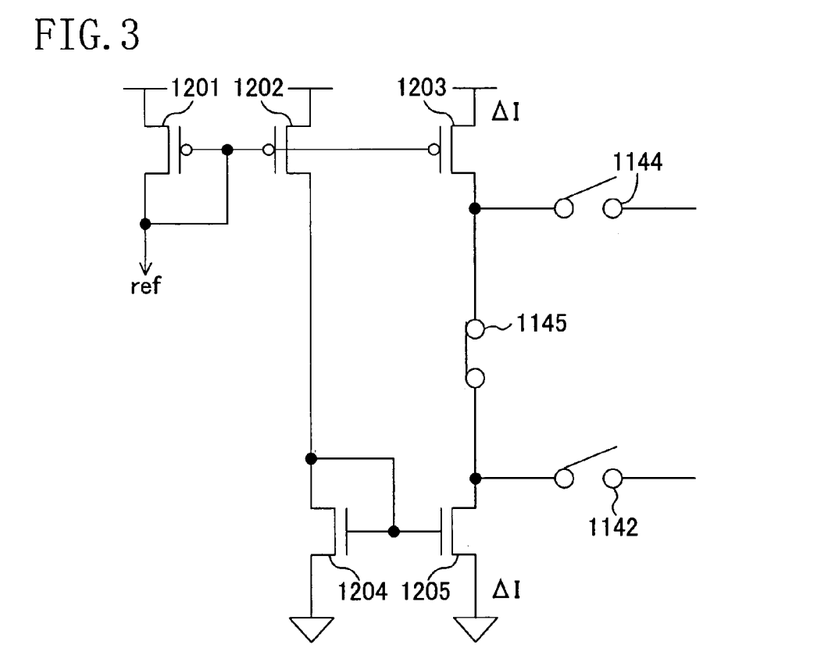
FIG. 3 is a circuit diagram showing a specific configuration of a power supply circuit.

The current sources 1141 and 1143 may specifically be configured of a current mirror circuit using P-channel transistors 1201 to 1203 and N-channel transistors 1204 and 1205 as shown in FIG. 3, for example. In other words, since the current sources 1141 and 1143 are connected to either a high-potential side power supply or the ground, unlike the current source 1131 in Embodiment 1, current sources allowing a flow of a current proportional to a predetermined reference current ref can be easily configured by use of a current mirror circuit.

In the output circuit configured as described above, during the steady state, a current (ΔI) among the current flowing through the current sources 1101 and 1102 flows through the current source 1141 or 1143. The output amplitude is therefore (±I). During the preemphasis, all the current flowing through the current sources 1101 and 1102 flows between the output terminals 1121 and 1122. The output amplitude is therefore (I+ΔI). At this time, with the switch 1145 turned ON, the current sources 1141 and 1143 are kept in the state of allowing a current of magnitude (ΔI) to flow therethrough. Accordingly, the power consumption of the entire output circuit is kept at (I+2×ΔI) at any time. Thus, in this embodiment, also, occurrence of power supply noise due to a variation in current consumption is prevented.

Embodiment 3

Figure 4:
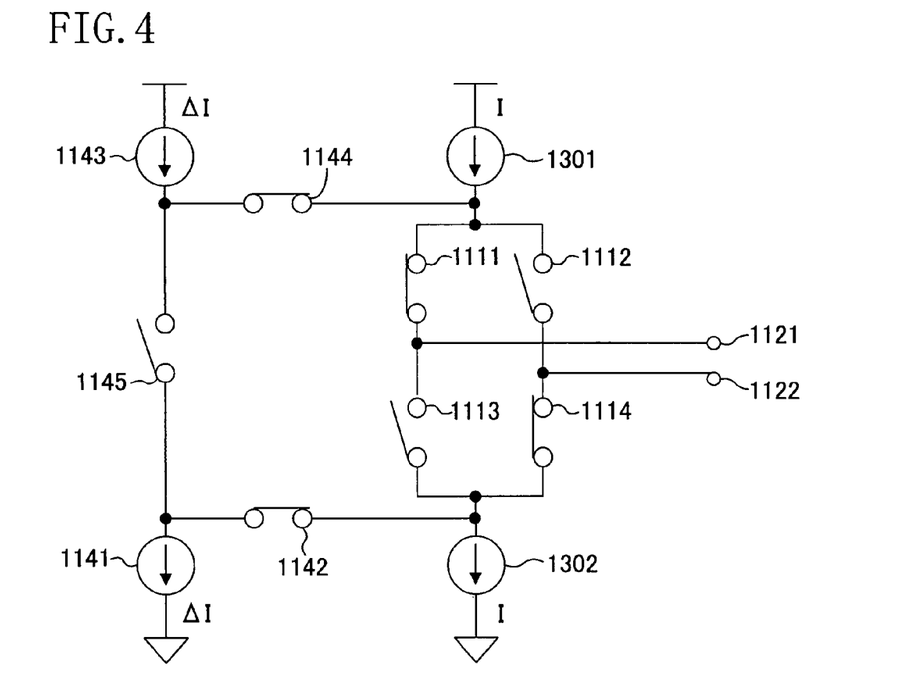
FIG. 4 is a circuit diagram of an LVDS output circuit of Embodiment 3.

As shown in FIG. 4, an output circuit of Embodiment 3 includes current sources 1301 and 1302 respectively allowing a current of magnitude (I) to flow therethrough, in place of the current sources 1101 and 1102 in Embodiment 2. The switches 1142 and 1144 are connected to the current sources 1301 and 1302. The switches 1142 and 1144 are ON during preemphasis, while the switch 1145 is ON during the steady state.

In the output circuit of this embodiment, during the preemphasis, the current ($\Delta I$) flowing through the current sources 1141 and 1143 flows between the output terminals 1121 and 1122 via the switches 1142 and 1144. The output amplitude is therefore (I+$\Delta I$). During the steady state, a current of magnitude ($\Delta I$) flows through the current source 1143, the switch 1145 and the current source 1141. The power consumption of the entire output circuit is therefore kept at (I+$\Delta I$) at any time. In other words, the predetermined amount ($\Delta I$) among the total current (I+$\Delta I$) flowing through the high-potential side current sources 1301 and 1143 flows to the low-potential side current sources 1302 and 1141 through which the total current (I+$\Delta I$) also flows. Thus, in this embodiment, also, the preemphasis can be performed without causing a variation in current consumption.

Figure 5:
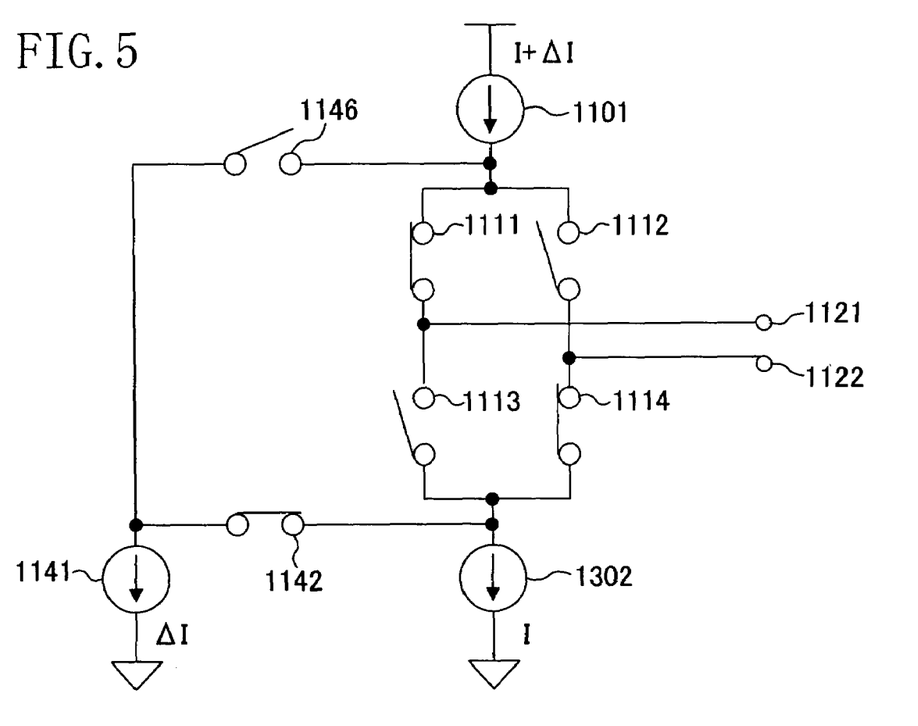
FIG. 5 is a circuit diagram of an LVDS output circuit of an alteration to Embodiment 3.

In the above example, the switches 1142 and 1144 were provided for convenience of description in comparison with Embodiment 2. Alternatively, either one of the switches may be omitted to give an invariably connected state. For example, the output of the current source 1301 and the output of the current source 1143 may be put in the invariably connected state. This is actually the same as the configuration shown in FIG. 5, in which the current source 1101 allowing a flow of a current of (I+$\Delta I$) and a switch 1146 operating the same as the switch 1145 are provided. In this case, also, the preemphasis can be performed while the current consumption is kept at (I+$\Delta I$).

Embodiment 4

Figure 6:
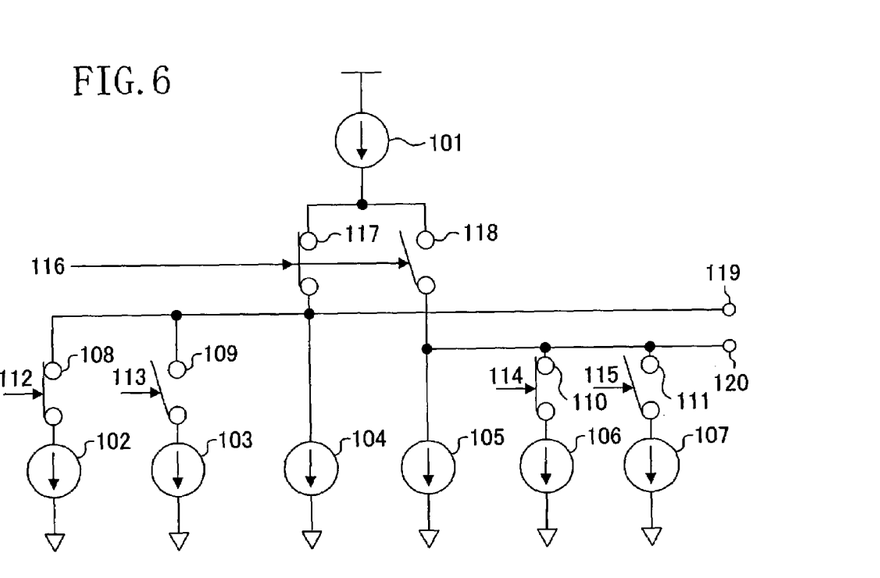
FIG. 6 is a circuit diagram of an LVDS output circuit of Embodiment 4.

An output circuit of Embodiment 4 will be described. The output circuit of Embodiment 4 includes current sources 101 to 107, switches 108 to 111 and switches 117 and 118.

The current source 101 is a current source having an output of (ejecting) a current of magnitude (2I), the current sources 102, 103, 106 and 107 and the current sources 104 and 105 are current sources having an output of (sucking) a current of magnitude ($\Delta I$) and a current of magnitude (I-$\Delta I$), respectively.

The switches 117 and 118 switch the polarity of the output depending on an input signal 116. For example, control is made so that if the input is in a high (H) level, the switch 117 is ON while the switch 118 is OFF, and if the input is in a low (L) level, the switch 117 is OFF while the switch 118 is ON.

The switches 108 to 111 are respectively connected in series with the current sources 102, 103, 106 and 107, and controlled to be ON if respective control signals 112 to 115 are in H level.

An external terminating resistance not shown is connected to output terminals 119 and 120 to allow a current to flow from the output terminal 119 to the output terminal 120 if the input signal 116 is in H level, while allowing a current to flow in the opposite direction if the input signal 116 is in L level.

Figure 7:
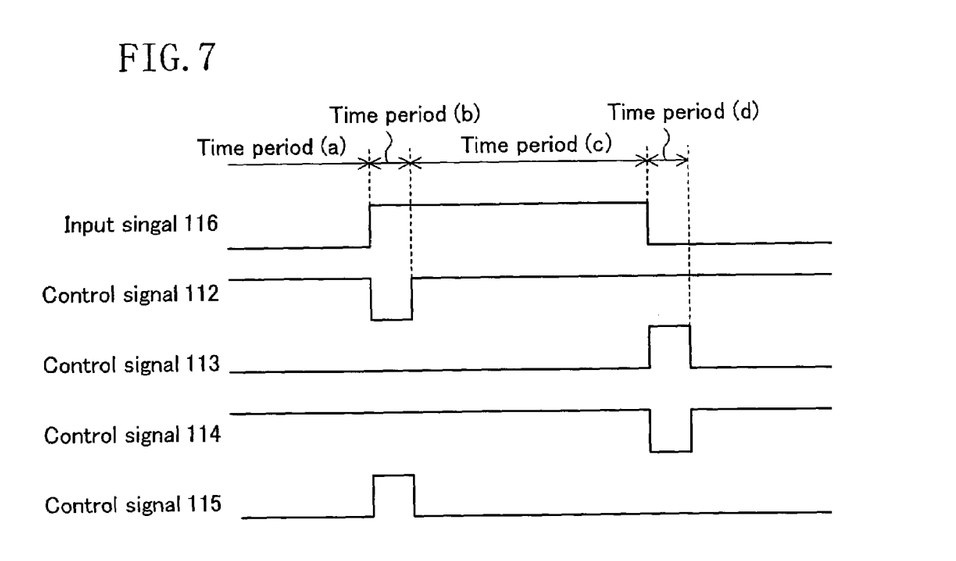
FIG. 7 is a timing chart showing the relationship between control signals and an input signal in Embodiment 4.
Figure 8:
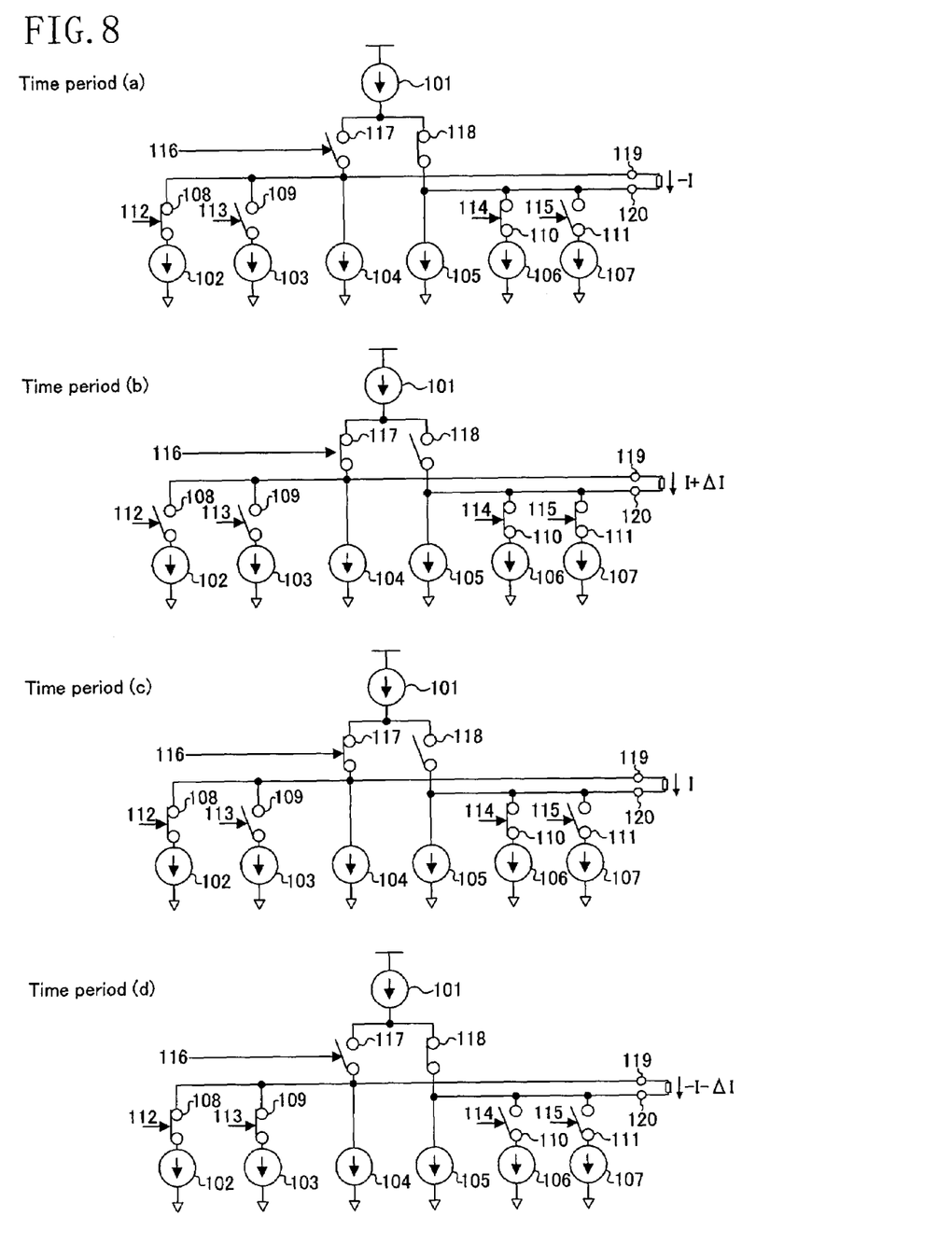
FIG. 8 is a circuit diagram showing the relationship between the states of switches and an output current in Embodiment 4.

The control signals 112 to 115 are controlled as shown in FIGS. 7 and 8 depending on the input signal 116 by a control circuit to be described later. During a time period (a) when the input signal 116 is in L level, the control signals 112 and 114 are in H level while the control signals 113 and 115 are in L level (the switches 108 and 110 are ON while the switches 109 and 111 are OFF). The output amplitude is therefore (–I).

During a time period (b) when the input signal 116 changes from L level to H level, the control signals 112 and 113 are in L level while the control signals 114 and 115 are in H level (the switches 108 and 109 are OFF while the switches 110 and 111 are ON). The output amplitude is therefore (I+$\Delta I$).

During the subsequent time period (c) when the input signal is in H level, the control signals 112 to 115 and the switches 108 to 111 resume the states in the time period (a), and thus the output amplitude is (I).

During a time period (d) when the input signal 116 changes from H level to L level, the control signals 112 and 113 are in H level while the control signals 114 and 115 are in L level (the switches 108 and 109 are ON while the switches 110 and 111 are OFF). The output amplitude is therefore (–I–$\Delta I$). Thereafter, the same states as in the time period (a) resume. In this way, while the balance of the currents flowing through the current sources 102 to 108 changes to allow for the preemphasis, the total of the currents flowing through the current sources 102 to 108 is kept constant.

As described above, by performing the preemphasis at the timing of transition of an input/output signal, steep edges are obtained. Moreover, the total of the currents drawn to the ground by the current sources 102 to 107 and the current supplied from the current source 101 are both (2I) irrespective of whether during the preemphasis or during the steady state. In this way, since the current consumption is kept constant at any time, occurrence of power supply noise due to a variation in current consumption is prevented. Thus, the output circuit of this embodiment can be easily applied to high-speed interfaces between a plurality of LSIs and between devices. In particular, by using the inventive output circuit for a digital-analog mixed LSI, it is easily possible to configure a high-speed interface while minimizing power supply noise. In addition, since the four current sources 102, 103, 106 and 107 allowing a flow of a current of magnitude ($\Delta I$) are connected to the ground, they can be configured of a current mirror circuit that mirrors the same reference current. Thus, it is easily possible to perform highly accurate preemphasis with a simple circuit configuration while minimizing the variation in flowing current.

An exemplary control circuit for generating the control signals 112 to 115 for controlling the switches 108 to 111 and the like will be described.

Figure 9:
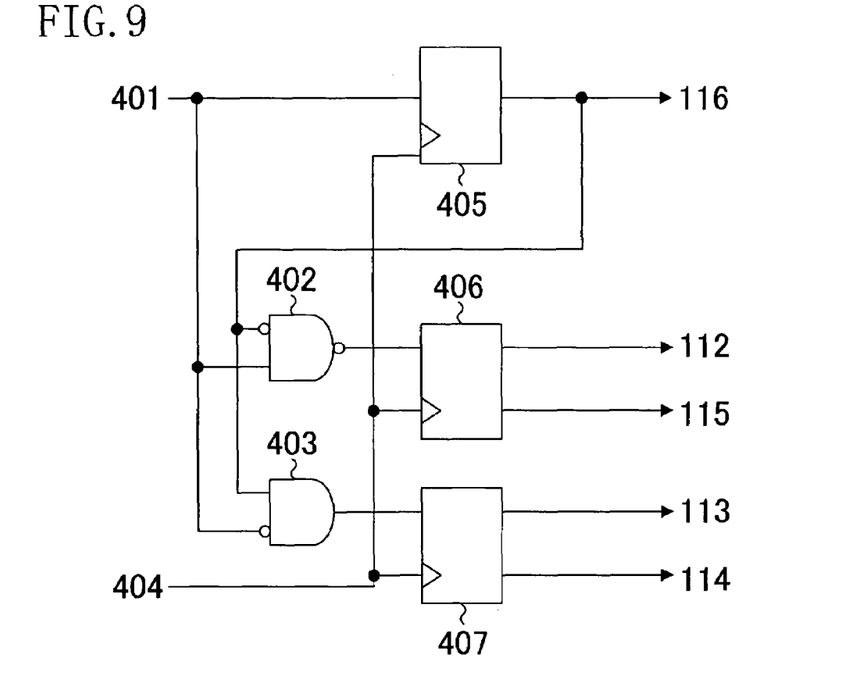
FIG. 9 is a circuit diagram showing an exemplary control circuit for generating control signals in Embodiment 4.

FIG. 9 shows a control circuit usable, for example, in such a case that the output of the LVDS output circuit changes in synchronization with a clock signal, that is, a case that a signal based on a data signal 401 and synchronous with a clock signal 404 is inputted as the input signal 116, for example. The control circuit includes gate circuits 402 and 403 and flipflops 405 to 407. In this control circuit, the original data signal 401 and the input signal 116 that is based on the data signal 401 and has been held in the flipflop 405 (signal currently being outputted and signal to be outputted next) are compared with each other by the gate circuits 402 and 403, to determine whether or not state transition has been made. Based on this determination, the control signals 112 to 115 that are in H or L level for the duration of one period of the clock signal 404 are outputted from the flipflops 406 and 407. Assuming that the outputted signals are time-sequence data, signals that increase their amplitudes by one-bit duration at the time of state transition will be obtained. By using the clock signal as described above, the control circuit can be configured of simple gate circuits, and thus size reduction can be easily attained.

Figure 10:
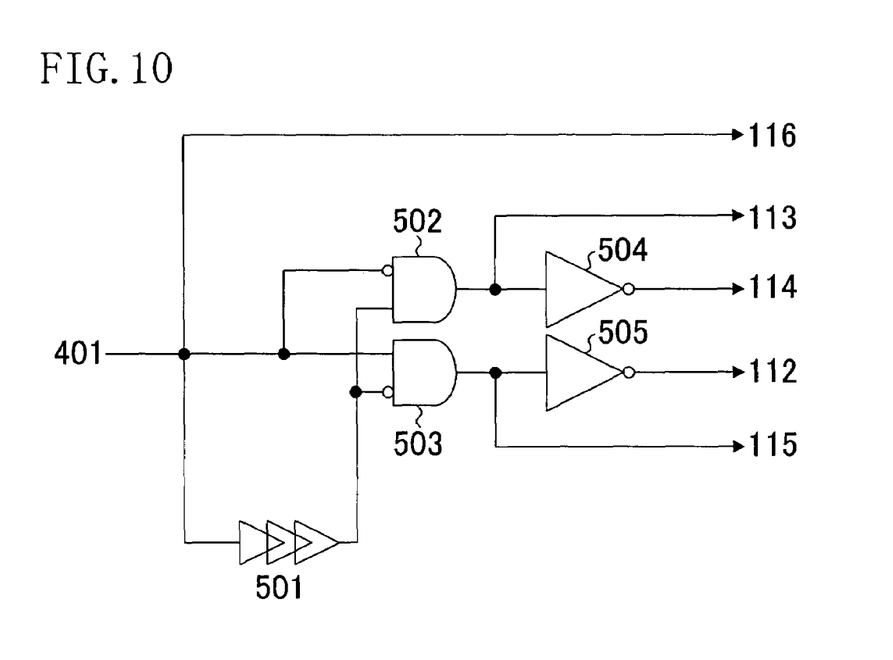
FIG. 10 is a circuit diagram showing another exemplary control circuit for generating control signals in Embodiment 4.

FIG. 10 shows a control circuit that can also be configured of simple gate circuits and usable, for example, even in such cases that the output signal of the LVDS output circuit is generated as a signal for an asynchronous circuit and that no clock is supplied to the LVDS output circuit although the output signal is for a synchronous circuit. The control circuit includes a delay circuit 501 for delaying the data signal 401 by a predetermined time, gate circuits 502 and 503 and NOT circuits 504 and 505. In this control circuit, the data signal 401 is used as the input signal 116 as it is. The gate circuits 502 and 503 respectively compare the data signal 401 with a signal obtained by delaying the data signal by a predetermined time with the delay circuit 501. The control signals 112 to 115 that become H or L level by the delay time are then outputted, to thereby perform the preemphasis.

Figure 11:
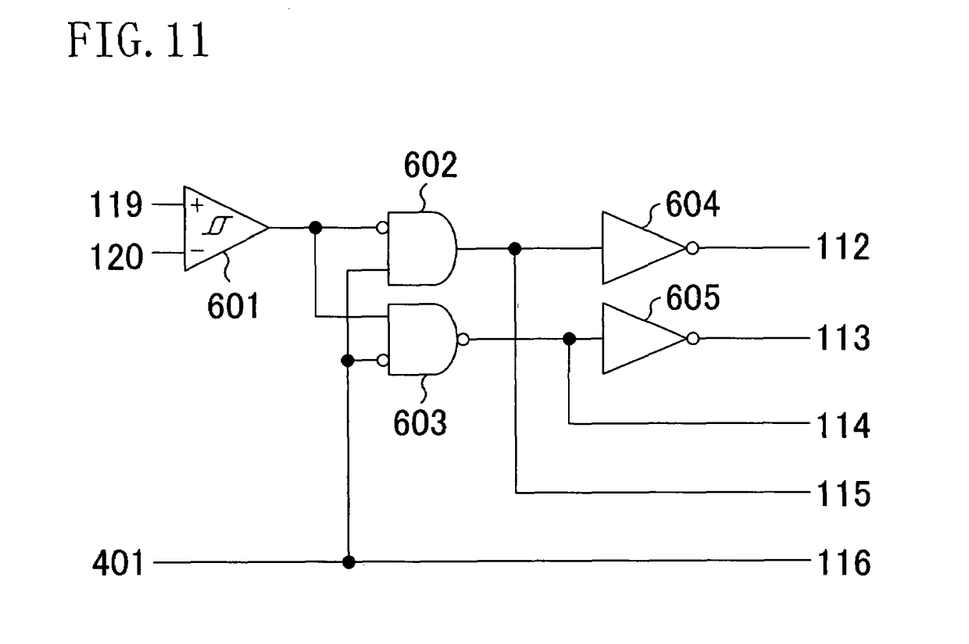
FIG. 11 is a circuit diagram showing yet another exemplary control circuit for generating control signals in Embodiment 4.

FIG. 11 shows a control circuit in which the control signals 112 to 115 are generated by comparing the output signal of the LVDS output circuit with the data signal 401. The control circuit includes a voltage comparator 601, gate circuits 602 and 603 and NOT circuits 604 and 605. In this control circuit, the data signal 401 (input signal 116) is compared with the comparison result corresponding to the differential voltage between the output terminals 119 and 120 obtained from the voltage comparator 601, to detect a state transition and thereby generate the control signals 112 to 115. With such a control circuit, preemphasis at optimum timing can be easily attained. Therefore, this embodiment is especially effective, for example, for such cases that high-frequency loss on the transmission line mainly occurs due to a factor internal to the LSI such as a capacitance with a serge protection element, for example, and that the floating capacitance to ground at the output terminals has changed.

(Alteration)

Figure 12:
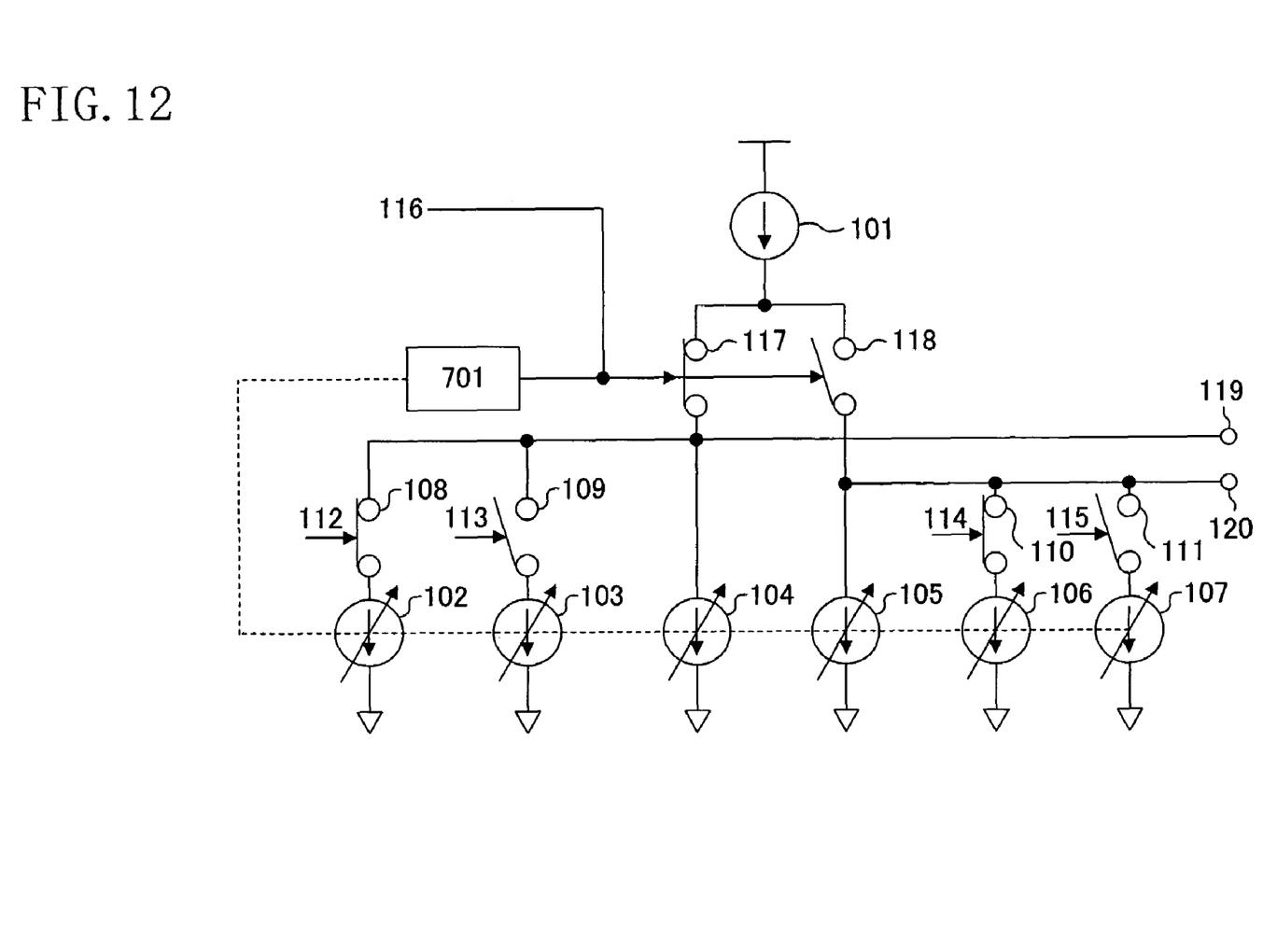
FIG. 12 is a circuit diagram of an LVDS output circuit of an alteration to Embodiment 4.

The magnitude of the output amplitude increased by the preemphasis is not necessarily constant as described above, but may be changed with the frequency of the output signal if the frequency varies. More specifically, as shown in FIG. 12, for example, a frequency-voltage converter 701 for outputting a voltage corresponding to the frequency of the input signal 116 may be provided, to control the magnitude (ΔI) of the current allowed to flow by the current sources 102 to 107 and the like with this voltage. The control of the magnitude of the current as described above can be easily realized using a current mirror circuit as the current source 102 and the like, in which the magnitude of the current of a current source serving as the mirror source may be changed. With the configuration described above, adjustment can be made so that, with increase of the high-frequency loss along with the frequency becoming higher, the increase amount of the amplitude obtained by the preemphasis is made greater. With this adjustment, an optimum preemphasis effect can be attained over a wide frequency range and for each system.

In the example of FIG. 6, the current source 101 supplies a current obtained from the power supply, and the current sources 102 to 107 draw a current into the ground. In reverse, the current source 101 may draw in a current and the current sources 102 to 107 may supply a current. This also applies to the configuration of FIG. 5.

In the example of FIG. 6, the four current sources 102, 103, 106 and 107 allowing a current of magnitude (ΔI) to flow therethrough were provided. Alternatively, since only two of these current sources are put in the operative state simultaneously when the control is made as shown in FIG. 8, two current sources may be shared to be selectively connected to the output terminals 119 and 120.

Although the current source 101 allowing a flow of a current of (2I) was used, this example is not limited to this. In the above case, the current sources 104 and 105 allowing a flow of a current of (I+ΔI) are connected to the output terminals 119 and 120 at any time, to enable reduction in the number of switches and reduction in voltage drop caused by switches. Alternatively, a current source allowing a flow of a current of (3I) may be used in place of the current source 101, and current sources allowing a flow of a current of (I) may be selectively connected to the output terminals 119 and 120. In this case, although the entire current consumption may increase, the effect of permitting the preemphasis without causing a variation in current consumption itself can also be obtained. Otherwise, a current source allowing a flow of a current of (I+ΔI) may be used in place of the current source 101, and only one of the two current sources 104 and 105 may be used and selectively connected to the output terminals 119 and 120. (In this case, the same effect will be obtained based on substantially the same current balance as the configuration of FIG. 5).

The control method for the currents of the current sources is not specifically limited, but in the case of performing control using switch elements as described above, higher response speed and device size reduction can be easily attained compared with analog current control.

INDUSTRIAL APPLICABILITY

The signal output circuit of the present invention has effects of speeding up signal transmission and minimizing power supply noise, and is useful as a signal output circuit for an interface between semiconductor devices and the like.

The invention claimed is:

1. A signal output circuit having a pair of output terminals and outputting an output current of a predetermined magnitude and a polarity corresponding to the level of an input signal during a steady state, the signal output circuit comprising:
    an output current path permitting a current to flow via a passage between the output terminals; and
    a bypass path permitting a current to flow bypassing the passage between the output terminals,
    wherein during preemphasis, the current flowing via the output current path is increased while the current flowing via the bypass path is decreased, to keep current consumption equal to that during the steady state.

2. The signal output circuit of claim 1, further comprising a high-potential side current source and a low-potential side current source both allowing a current greater than the output current to flow therethrough,
    wherein during the preemphasis, the current flowing through the high-potential side current source and the low-potential side current source flows via the output current path, and
    during the steady state, part of the current flowing through the high-potential side current source and the low-potential side current source flows via the bypass path.

3. The signal output circuit of claim 2, wherein during the steady state, the bypass path allows a current flowing through the high-potential side current source to flow to the low-potential side current source by a predetermined amount.

4. The signal output circuit of claim 2, wherein the bypass path comprises:
    a low-potential side bypass circuit permitting bypassing of a current flowing from the high-potential side current source to the passage between the output terminals by a predetermined amount; and a high-potential side bypass circuit permitting bypassing of a current flowing from the passage between the output terminals to the low-potential side current source by a predetermined amount, wherein the high-potential side bypass circuit and the low-potential side bypass circuit are switched between a state of permitting bypassing of a current flowing between the output terminals and a state of being disconnected from the output terminals and connected in series to each other.

5. A signal output circuit having a pair of output terminals and outputting an output signal of a predetermined magnitude and a polarity corresponding to the level of an input signal during a steady state, the signal output circuit comprising:

a first current source for allowing a current twice as large as the output current to flow therethrough;

a switching element for selectively connecting the first current source to either one of the pair of output terminals; and second and third current sources each connected to one or the other of the output terminals for allowing a current twice as large as the output current in total to flow therethrough, wherein during preemphasis when the first current source is connected to one of the output terminals in response to a level change of the input signal, a current flowing through the second current source connected to the one of the output terminals is reduced by a predetermined amount, and a current flowing through the third current source connected to the other of the output terminals is increased by the predetermined amount.

6. The signal output circuit of claim 5, wherein the second and third current sources respectively have a plurality of constant current circuits, and the magnitudes of the currents flowing through the second and third current sources are controlled by selectively connecting the constant current circuits to the output terminals.

7. The signal output circuit of claim 5, wherein the second and third current sources respectively have a current mirror circuit, and the magnitudes of the currents flowing through the second and third current sources are controlled by controlling the magnitude of a current of a current source serving as a mirror source.

8. The signal output circuit of any one of claims 1 to 5, further comprising:

a first flipflop circuit for outputting the input signal in synchronization with a predetermined clock signal; and a second flipflop circuit for outputting a signal based on a difference in level between an input signal and output signal of the first flipflop circuit in synchronization with the clock signal to control the timing of the preemphasis.

9. The signal output circuit of any one of claims 1 to 5, further comprising a delay circuit for delaying the input signal, wherein the timing of the preemphasis is controlled based on a difference in level between the input signal and a delayed signal.

10. The signal output circuit of any one of claims 1 to 5, wherein the timing of the preemphasis is controlled based on the level of the input signal and the polarity of an output signal.

11. The signal output circuit of any one of claims 1 to 5, wherein the increase amount of a current flowing via the output current path or the increase/decrease amount of a current flowing through the second and third current sources is controlled depending on the frequency of the input signal.

* * * * *